(No Model.) 7 Sheets—Sheet 2.

P. HANSON.
GRAIN BINDER.

No. 424,709. Patented Apr. 1, 1890.

Witnesses:
Francis W. Parker
Nora E. Marshall

Paul Hanson
Inventor:
By Burton and Burton
Attys (No Model.) 7 Sheets—Sheet 4.

P. HANSON.
GRAIN BINDER.

No. 424,709. Patented Apr. 1, 1890.

Fig. 4.

(No Model.) 7 Sheets—Sheet 5.
P. HANSON.
GRAIN BINDER.
No. 424,709. Patented Apr. 1, 1890.
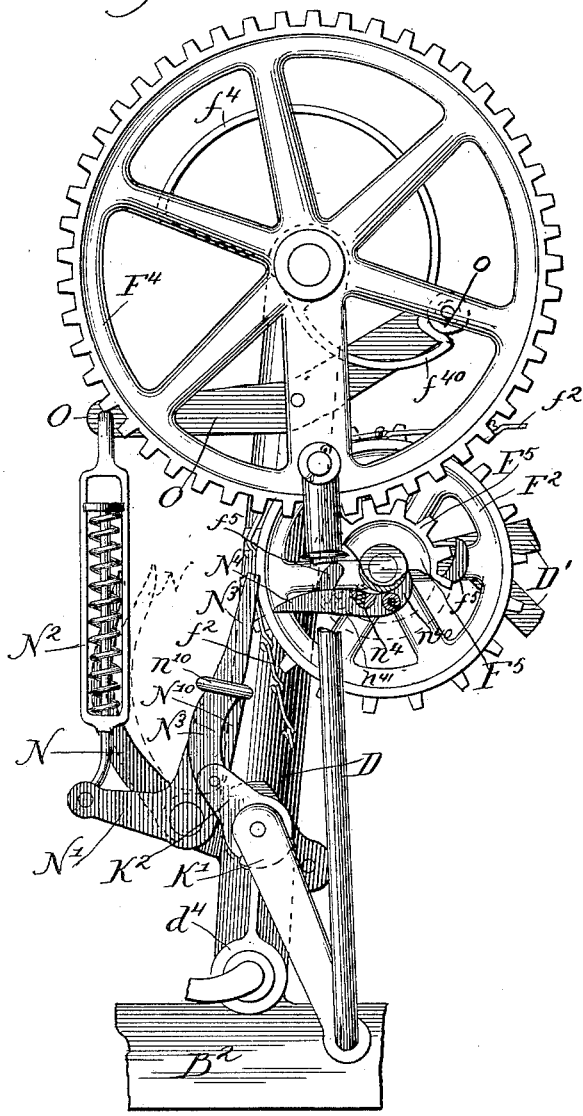
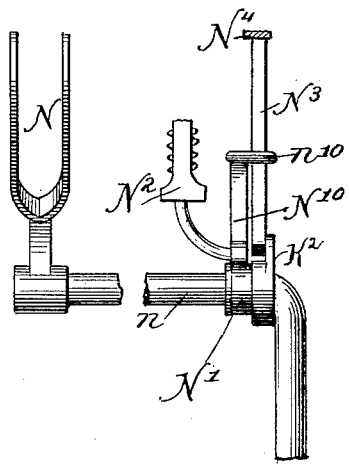

(No Model.) 7 Sheets—Sheet 6.

P. HANSON.
GRAIN BINDER.

No. 424,709. Patented Apr. 1, 1890.

Witnesses:
Jean Elliott
John R. Nettenstrom

Inventor:
Paul Hanson
By Burton and Burton
his Attys (No Model.) 7 Sheets—Sheet 7.
P. HANSON.
GRAIN BINDER.
No. 424,709. Patented Apr. 1, 1890.
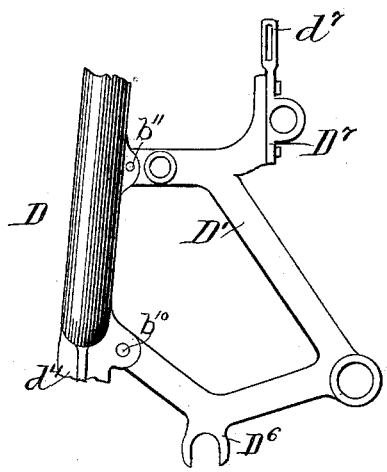
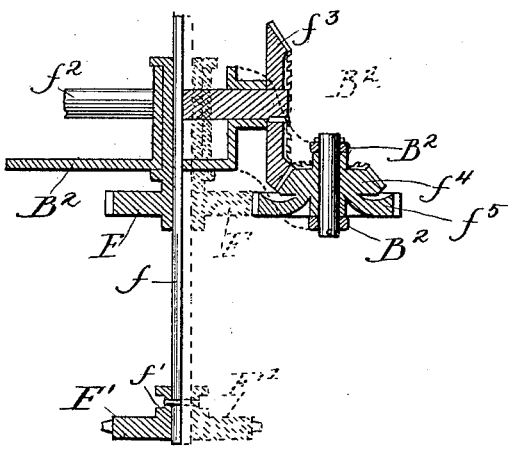
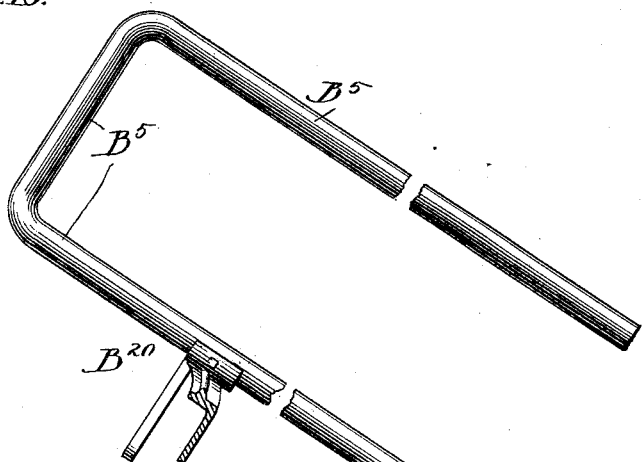
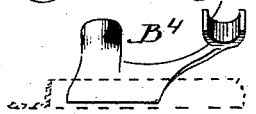
Witnesses:
Frank J. Blanchard
Fred Gerlach
Inventor:
Paul Hanson
By Burton and Burton
his Attys

UNITED STATES PATENT OFFICE.

PAUL HANSON, OF ST. PAUL, MINNESOTA.

GRAIN-BINDER.

SPECIFICATION forming part of Letters Patent No. 424,709, dated April 1, 1890.

Application filed September 5, 1887. Serial No. 248,902. (No model.)

*To all whom it may concern:*

Be it known that I, PAUL HANSON, a citizen of the United States, residing at St. Paul, in the county of Ramsay and State of Minnesota, have invented certain new and useful Improvements in Grain-Binders, which are fully described and shown in the following specification, reference being had to the accompanying drawings, forming part hereof, and wherein—

Figure 1:
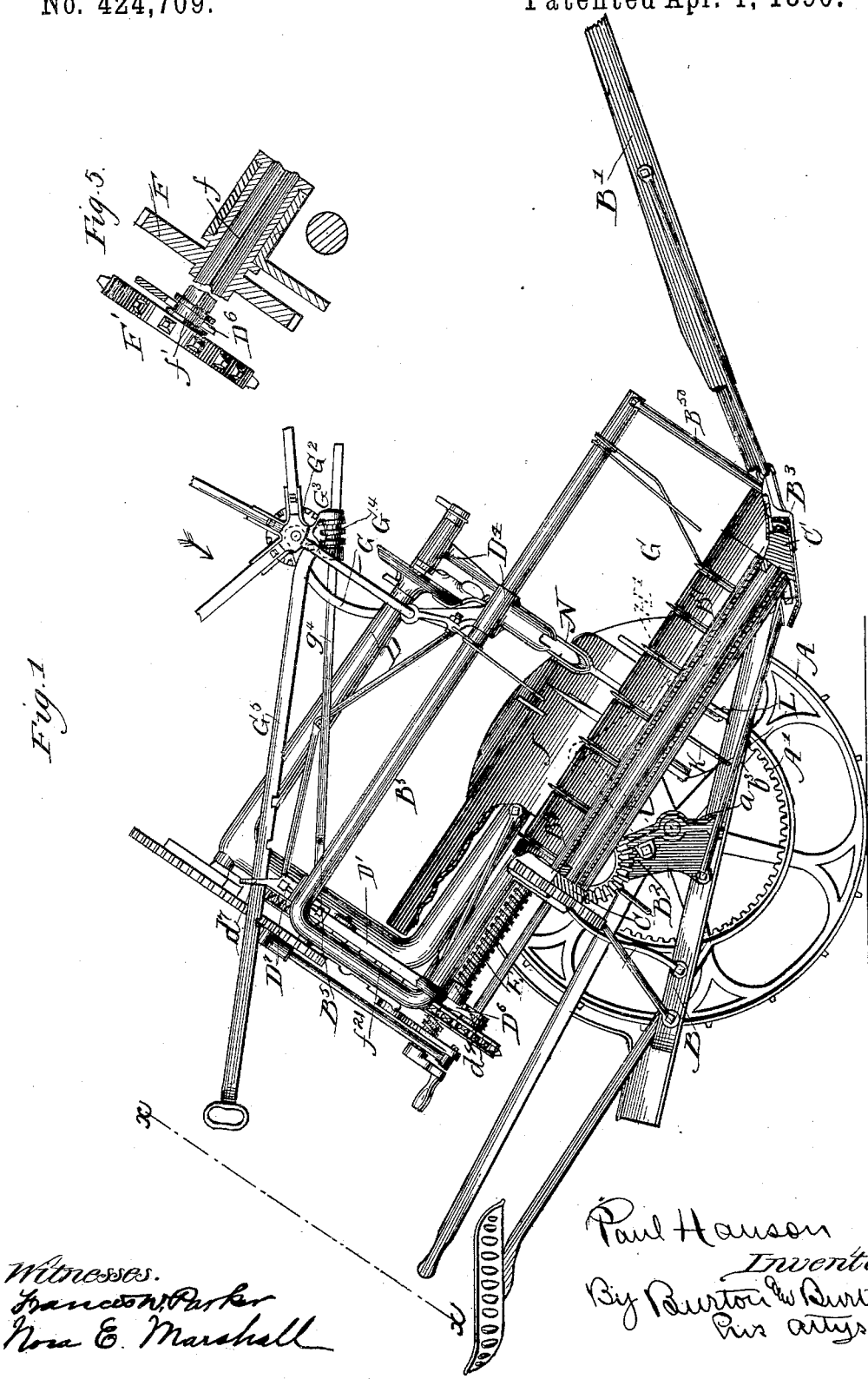
Figure 2:
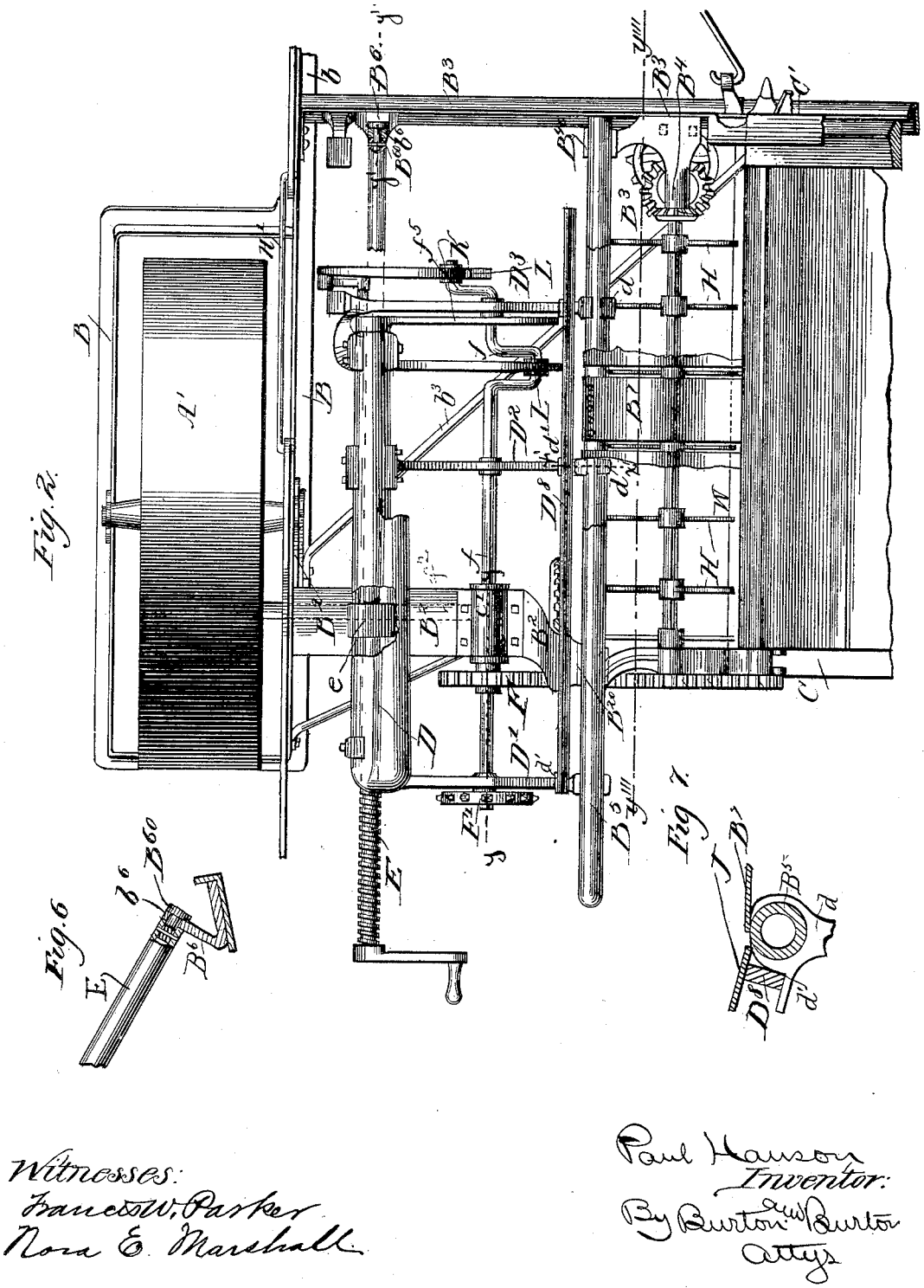
Figure 3:
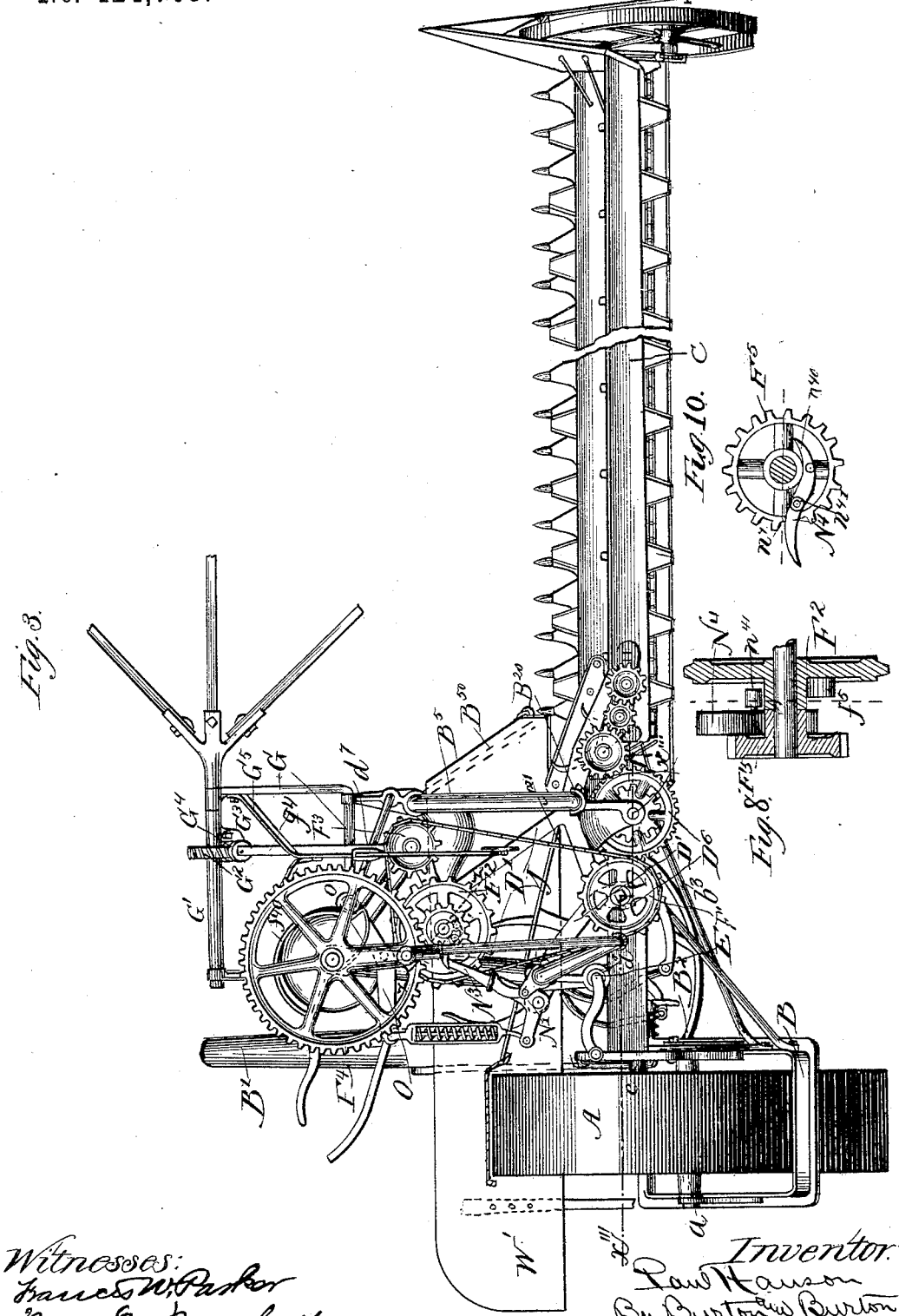
Figure 11:
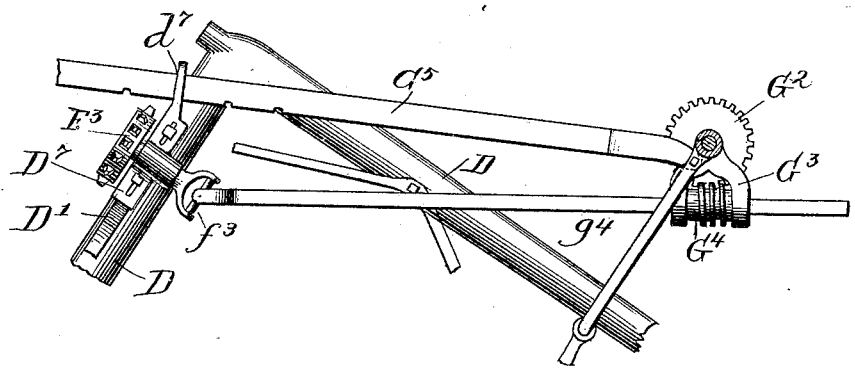
Figure 12:
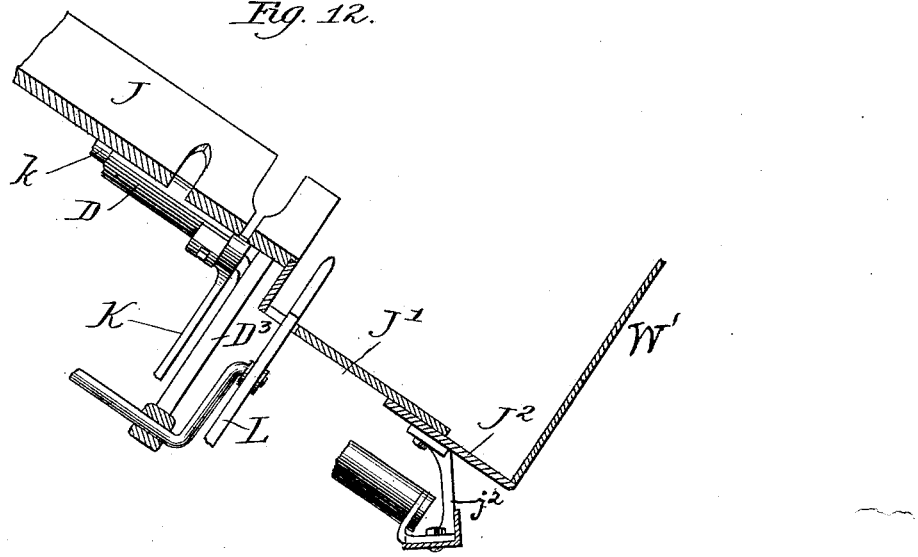

Figure 1 is an inner or grain side elevation of a harvester embodying my invention, having the platform-conveyer cut away by a vertical plane just grainward from the inside divider. Fig. 2 is a plan of a portion of the harvester-frame and of the binder-frame, the deck and the greater part of the mechanism being removed to disclose the frame-work beneath. Fig. 3 is a projection of the parts shown in Fig. 1 upon a plane indicated by the line $x\ x$ against said Fig. 1. Fig. 4 is a front elevation of the binder-frame and decks, showing part of the finger-bar and drive-wheel, the forward part of a certain frame $B^5$ being omitted to show parts behind it. Fig. 5 is a section through $y\ y$, Fig. 2. Fig. 6 is a section through $y'\ y'$, Fig. 2. Fig. 7 is a section through $x'\ x'$, Fig. 2. Fig. 8 is a section through $z\ z$, Fig. 3. Fig. 9 is a detail elevation from the discharge side of the compressor and trip mechanism. Fig. 10 is a sectional elevation of the gear-wheel on which is pivoted the trip-dog, the shaft or axle being in section and the view looking rearward. Fig. 11 is a detailed inner side elevation of the reel-driving mechanism. Fig. 12 is a section through line $z'\ z'$ on Fig. 4. Fig. 13 is a rear end elevation containing details of the tripping mechanism of the binder. Fig. 14 is a sectional plan of a portion of the gearing by which the power is communicated from the driving-wheel to the binder-train, section being made at the plane indicated by the line $x'''\ x'''$ on Fig. 3. Fig. 15 is a vertical section through the line $y'''\ y'''$ on Fig. 2, looking stubbleward. Fig. 16 is a detail front elevation showing the front part of the frame $B^5$ which appears in Fig. 15. Fig. 17 is an elevation of a brace or bracket which constitutes part of the binder-frame.

A is the drive-wheel.

$A'$ is the main driving-gear rim or master-wheel fixed thereon.

B is the wheel-frame, which is made of angle-iron bar bent around the wheel and entirely encircling it and having its inner side extended forward to afford securement for the pole $B'$.

$B^2$ is a bracket, which is secured fast to the inner side of the wheel-frame and extended grainward. It has the bearings for one end of the drive-wheel axle and for the main driving-gearing of the harvester.

$B^3$ is the finger-bar, which is of angle-iron secured to the inner side of the wheel-frame, and extended grainward and braced by the bar $b^3$ extended from a point near the inside divider to a point pretty well back on the inner side of the wheel-frame.

$B^4$ is a bracket secured on the finger-bar to afford bearing for the forward end of a certain shaft which communicates power to the cutting mechanism, and also to afford support for the forward end of certain part of the frame-work which relates to the binder.

$B^5$ is a tubular frame shaped like a letter U turned on one side—thus, C—having its open end forward and the bow or upright part at the rear. It is supported at the rear by resting in a saddle $B^{20}$ on the bracket $B^2$, and at the forward end by resting in a similar saddle $B^{40}$ on the bracket $B^4$. It is braced by braces $B^{50}\ B^{51}$, secured to its upper forward end, and extended one to the right and one to the left and secured below to the main frame-work, as to the shoe, which has the inside divider at one side and to the projecting end of the wheel-frame at the other side. The gearing-bracket $B^2$ is considerably elevated as compared with the finger-bar and the bracket $B^4$, and the frame $B^5$ is therefore inclined at an angle of from thirty to forty-five degrees downward from rear to front. The conveyer-platform sills C and $C'$, which are secured the former to the bracket $B^2$ and the latter to the finger-bar have the same difference of level, and the conveyer-platform is therefore inclined equally with the frame $B^5$.

The binder-frame comprises the customary U-shaped frame D, the bracket $D^4$ extending from the forward end of the upper arm to the upper arm of the frame $B^5$. The bracket or brace D' is secured at two points $b^{10}$ and $b^{11}$ to the upright part of the U-frame D, and the brackets or braces $D^2$ $D^3$ are secured to the lower arm of said U-frame. These brackets $D'$, $D^2$, and $D^3$ extend to the lower arm of the frame $B^5$, and all of the brackets and braces $D'$ $D^2$ $D^3$ $D^4$ terminate in slide-bearing boxes or sleeves which encircle the arms, respectively, of the frame $B^5$, so that while sustaining the binder-frame said frame $B^5$ affords ways on which it is adjusted back and forward. Such adjustment is effected by means of the screw-shaft E, which has its bearings on the harvester-frame, the rear bearing being at $e$ in the gearing-bracket $B^2$, and the forward bearing being formed in a bracket $B^6$, secured to the finger-bar.

Behind the rear bearing on the harvester-frame the binder-frame has a lug $d^4$ projecting downward and apertured and interiorly threaded to receive the screw-shaft E, which is screwed through it. The said shaft has a crank-handle at the rear end by which it is rotated. The forward bearing of the shaft is so constructed as to serve as a stop against endwise motion of the shaft, as follows: The bracket $B^6$ has a lug $b^6$, against which the end of the shaft E abuts. A thread is tapped in the interior of the shaft E, and a bolt $B^{60}$, having a smooth portion next its head and a broad and substantial head, is inserted through an aperture which is drilled in the lug $b^6$ and is screwed into the end of the shaft E, and, if desired, it may be further secured by being pinned through. The head of the bolt stops the shaft against rearward motion and the lug stops it against forward motion, and the smooth surface of the bolt next the head serves as the bearing. The rotation of the shaft therefore causes the binder-frame to travel back and forward on the harvester-frame by reason of the lug $d^4$ being engaged by the thread on the shaft screwed through it.

Journaled in the gearing-bracket $B^2$ is a wheel F, which derives motion from the main driving-train of the harvester by means of the main driving pinion-shaft $f^2$, which is journaled in the bracket $B^2$, and has keyed fast to its grainward end the bevel gear-wheel $f^3$, which meshes with and drives the beveled gear-wheel $f^4$, which has integral with it the gear-wheel $f^5$ and is journaled in the bracket $B^2$. Said gear-wheel $f^5$ meshes with the gear-wheel F, through whose hub, which constitutes its shaft, there is a square opening, and through that opening the square shaft $f$ is inserted.

On the rear end of the shaft $f$ there is pinned fast the sprocket-wheel F', and the hub of said sprocket-wheel is peripherally grooved, and in said groove $f''$ the forked end of the lug $D^6$, which projects downward from the brace D' of the binder-frame, engages, so that as the binder-frame is moved back and forward over the harvester-frame the wheel F' is carried with it back and forward, its shaft sliding through the hub of the wheel F, and in all positions deriving power from said wheel. A chain around the sprocket-wheel F' passes around the wheel $F^2$, which is journaled on the binder-frame and communicates power to the binder mechanism.

Upon a bracket $D^7$, which is secured to the binder-frame by a bolt through an elongated hole in the said bracket, there is journaled the sprocket-wheel $F^3$, which, by means of the adjustability of the bracket on which it is journaled, serves as a tightener for the chain $f^2$.

Upon the binder-frame I pivot the reel-frame, which comprises a U-shaped frame G, whose upwardly-extended arms have bearings at their upper ends for the reel-shaft G'. On that shaft there is pinned fast the worm-wheel $G^2$, and between said wheel and one of the shaft-bearings there is hung on the shaft the yoke or swinging bracket $G^3$, in which there is journaled the worm $G^4$, which engages the worm-wheel $G^2$. The hub of this worm has a square axial aperture, through which is inserted the square shaft $g^4$, which is connected by a universal joint at $f^3$ to the shaft of the sprocket-wheel $F^3$, so that said sprocket-wheel, while serving as a tightener for the chain $f^2$, also drives the reel.

The bracket $D^7$, which has the bearings for the sprocket-wheel $F^3$, is secured to an arm $D''$ of the bracket D', and is extended above said wheel in the loop or slotted lug $d^7$, and a handle-bar $G^5$, which is forked at its front end and pivoted to the two arms of the reel-frame, extends rearward through the slot in said lug, and, being notched on the under edge, engages the lower edge of the slot. At the rear end a convenient handle is attached, and this handle-bar thus serves to adjust the reel by rocking its frame in its bearings on the binder-frame and locking it in any desired position by the engagement of its notches on the edge of the slot in the bracket $D^7$.

The universal joint, which connects the shaft $g^4$ to the shaft of the wheel $F^3$, permits both the adjustment of the reel to different positions and also the adjustment of the bracket $D^7$ to tighten the chain without interfering with the operation of the reel.

The grain is cleared off of the conveyer by means of the toothed clearing-wheels H H, which revolve up through slots in the deck $B^7$, which is curved up from the receiving edge adjacent to the discharge edge of the conveyer and secured above the lower arm of the frame $B^5$. At its receiving or grain side it is fastened to the cross-bar W, which extends from the rear sill to the front sill, to both of which it is fastened. This part of the deck is stationary; but to the binder-frame there is also secured a deck J, which moves with said frame in its fore-and-aft movement. The inner edge of this deck J slides upon and overhangs the stubbleward edge of the frame $B^5$. The needle K and the packers L L, moving with the binder-frame in its adjustment, are in constant and unchanging relation to the deck J, and the fixed deck B⁷ does not extend far enough toward the wheel to encounter the needle or packers.

It will be observed that the binder-deck, sloping upward from front to rear, is located above and in front of the line of drive-wheel axle, so that the bundle when bound thereon is at its rear end already raised nearly to the top of the wheel, and the band, although lower, is opposite the forward part of the wheel and is about equally near the top of the wheel at that part, while the butts are entirely forward of the plane of the wheel, which therefore offers no obstruction as respects that end of the bundle to prevent its discharge stubbleward.

In order to elevate the bundle the slight distance that it is necessary to further elevate it in order to make it clear the wheel in its discharge, I make the platform J, which is inclined upward from front to rear, slope upward also stubbleward—that is, toward the wheel—so that the action of the packing, binding, and discharging arms of the binder will easily force the bundle up that incline as they drive it stubbleward, and will thus cause it to be discharged over the wheel without the employment of any special mechanism for elevating either the loose grain or the bundle after it is bound.

I do not find it necessary to extend the deck J forward the whole length of the grain, but I stop it short a few inches in front of the plane of the needle, and thus form a step or jog down to the level of the fixed platform B⁷, an extension of which—viz., the deck J², hereinafter described—extends stubbleward forward of the foremost position of the foremost packer to the drive-wheel, or within a very short distance of it. This allows space for the butts when, as is usually the case, they are larger than the middle on account of short straw and grass and weeds bound in with them, and prevents the bundle from being so difficult to advance over the sloping deck in the discharge movement. This step or jog is best located at the vertical plane of the forward packer, so that said packer comes up just in front of the forward edge of the deck J, and just in front of the said packer the binder-deck has a continuation, which, however, is not inclined upward toward the drive-wheel, but extends across from the deck B⁷ toward the wheel at the same level as the discharge edge of said deck B⁷. This extension of the binder-deck is indicated by the letter J' in the drawings. The forward edge of this deck rests upon the upper surface of the fixed deck J², which is supported upon brackets j², secured to the finger-bar. As the binder is adjusted back and forward, the binder-deck extension J' slides over the fixed deck J², and the width of the latter deck from front to rear is such only as to extend to or nearly to the vertical plane of the forward packer when the binder is farthest forward, and when that is the position of the binder the extension J' covers the deck J² nearly its entire width; but when the binder is at its rearmost position the forward edge of the extension J' laps only an inch or two onto the rear edge of the deck J². These two decks J' and J² are hereinafter referred to as forming a telescoping deck.

In order to check the grain from sliding forward, I provide at the forward edge of the deck J², extending across the whole front end of the machine from the stubbleward end of the cut to the discharge side of the wheel, a board W', set up at right angles to the deck J². It is supported by the braces B⁵⁰ B⁵¹, immediately in the rear of which it is placed.

In order that the brackets D² and D³ may slide on the lower arm of the frame B⁵, notwithstanding that the ends of the strips which compose the slotted deck B⁷ are fastened to the upper side of said arm, I make the bearings d, which terminate said brackets, only about three-quarters of a circle, as seen in Fig. 2, the opening of one quarter being left in the proper position to pass the fastenings of the said deck B⁷ to the said frame B⁵.

In order to afford good facility for securing the decks J and J' to the binder-frame at their inner or receiving edge, I make upon the brackets D', D², and D³, adjacent to the sleeves or clasps d, the seats d' for the wooden bar D⁸, which is secured therein, and thus, besides serving the purpose of attaching the deck, also braces said brackets D', D², and D³, so that they are not wrenched or cramped in the sliding of the binder. The said brackets D', D², and D³ have each a bearing for the shaft f, which serves as the packer-driving shaft, having the cranks $f^3$ and $f^5$, on whose wrists the packers are journaled and by which they are operated in the familiar manner.

N is the trip-lever, which is fixed on the rock-shaft n. Said trip-lever serves also as the compressor, as will hereinafter appear, and it will be referred to by either name, according to the function which is being considered. The rock-shaft n is journaled on lugs on the lower arm of the binder-frame, and at the rear end it has fixed fast to it the bell-crank lever N', to one arm of which there is fastened the lower end of the compressor-spring link N², and the arm N¹⁰ is terminated by a loop $n^{10}$, through which is inserted the trip N³, which slides through said loop and is pivoted at the lower end to the short lever-arm K² on the hub of the needle-shaft crank-arm K', (which is fixed, as usual, on the rear end of the needle rock-shaft k to actuate the needle K.) The upper end of the compressor-spring link N² is pivotally connected to the lever O, which is pivoted on the binder-gear standard, and at the other end carries a stud and roll abutment o, which projects laterally into the plane of the eccentric cams $f^4$ $f^{40}$ on the main binder-gear F⁴. The upper end of the trip N³ at proper time engages the end of the dog N⁴, which is pivoted on the forward face of the gear-wheel F⁵, which actuates the main binder-gear wheel F⁴. A spring $n^4$, acting between the dog $N^4$ and the hub of the gear-wheel $F^5$, tends to throw the tail $n^{40}$ of said dog in against the hub and to throw the other end out. Said dog has the stud and roll $n^{41}$ abutting laterally toward the sprocket-wheel $F^2$, which is loose on the same stud-bearing which supports the gear-wheel $F^5$, and said sprocket-wheel has on its face toward the gear-wheel $F^5$, one hundred and eighty degrees apart, the two similar abutments $f^5 f^5$, which in proper time are engaged by the abutment $n^{41}$, whereby the two wheels $F^2$ and $F^5$ are locked together, and the former, which is continuously in motion, thus drives the binder.

The action by which the above-stated results are effected I will now describe in detail. When the pressure of the bundle against the trip-lever and compressor N is sufficient to compress the spring in the compressor-spring link $N^2$ and rock the shaft $n$, the loop $n^{10}$ on the arm $N^{10}$ of the lever $N'$ draws the trip $N^3$ out of engagement with the end of the dog $N^4$ and permits the spring $n^4$ to force said dog into position, where its abutment $n^{41}$ is engaged by the abutment $f^5$ on the revolving sprocket-wheel $F^2$, and thereby the binder is brought into action, and immediately the needle rock-shaft receiving its proper motion the lever-arm $K^2$ draws the trip $N^3$ down through the loop $n^{10}$, so that its upper end is out of range of the trip-dog $N^4$ and cannot collide with it, even if the pressure should be removed from the trip-compressor N. This state of affairs continues until the needle comes nearly back to its position of rest. At the same time the cam $f^4$ on the main binder gear-wheel $F^4$, acting against the abutment $o$ on the end of the lever O, rocks said lever as the wheel $F^4$ revolves, and drawing up the outer end of the lever and the compressor-spring link $N^2$ and the outer end of the lever $N'$ forces the compressor N inward against the bundle and compresses the same, the spring in the link $N^2$ causing the bundle to receive a yielding and not a positive pressure. This action continues until the bundle is ready to be discharged, and at that time the abutment $o$ runs off the cam $f^4$ and allows the compressor to rock out of the way of the bundle, and then the cam $f^{40}$, engaging the abutment $o$, again rocks the the lever O, so that it lifts the compressor to its place again, and said compressor, being now free of pressure, comes back to its position occupied before it was pressed by the bundle, which position is such that the lever $N^2$ permits the trip to stand leaning far enough inward to come into the path of the end of the dog $N^4$ as soon as the needle rock-shaft has rolled back far enough for the lever-arm $K^2$ to lift said trip up into range of said dog. This last position is reached and the dog forced out of engagement with the sprocket-wheel $F^2$ just at the instant that the abutment $o$ runs off the corner of the cam $f^{40}$ and locks the binder against reverse action.

I claim—

1. A self-binding harvester having the binder-deck located between the drive-wheel and the conveyer, and above and forward of the line of the drive-wheel axle and sloping upward from front to rear and from the receiving to the discharge edge, whereby the sheaf is elevated at the rear and guided over the wheel at the forward quarter thereof, substantially as set forth.

2. In combination with the harvester-frame, comprising the bent tubular frame $B^5$, rigid with the remainder of the harvester-frame and having the two parallel arms one above the other, and the binder-frame supported and sliding on said arms, substantially as set forth.

3. In combination with the rear gearing-bracket $B^2$, and the forward gearing-bracket $B^4$, having, respectively, the saddles $B^{20}$ and $B^{40}$, the frame $B^5$, resting its lower arm in said saddles, and the braces $B^{50}$ and $B^{51}$, secured to the overhanging end of the upper arm, and extending down one toward the right and one toward the left and secured below to the harvester-frame, substantially as set forth.

4. In combination, substantially as set forth, the needle rock-shaft having the crank-arm $K^2$, and the trip $N^3$, pivotally connected to said arm, the trip-lever N and its rock-shaft having the lever-arm $N^{10}$, provided with the loop $n^{10}$, encircling the trip $N^3$, whereby the trip, after being disengaged by the pressure of the bundle against the trip-lever, is held out of engagement until the needle-arm returns to rest.

5. In combination with the compressor N and its rock-shaft, and the lever $N'$, fixed on said rock-shaft, the main binder-driving gear-wheel $F^4$, the cam $f^{40}$ thereon, the lever O, and the link $N^2$, connecting it to the lever $N'$ of the compressor rock-shaft, said lever O having the stud $o$, which is engaged by the cam $f^{40}$ and runs off the same, whereby the same lever and stud thereon which communicate pressure to the bundle to compress it serve also to lock the binder against reversion, substantially as set forth.

PAUL HANSON.

Witnesses:
 FRED. GERLACH,
 CHAS. S. BURTON.